US006361593B2

(12) United States Patent
DeLuca, Jr. et al.

(10) Patent No.: US 6,361,593 B2
(45) Date of Patent: *Mar. 26, 2002

(54) LUSTROUS INTERFERENCE PIGMENTS WITH BLACK ABSORPTION COLOR

(75) Inventors: Carmine Vincent DeLuca, Jr.; William P. Kurtenbach, both of Peekskill; Christine Mans, LaGrangeville, all of NY (US)

(73) Assignee: Engelhard Corporation, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/852,162

(22) Filed: May 9, 2001

Related U.S. Application Data

(63) Continuation of application No. 09/256,834, filed on Feb. 24, 1999, now Pat. No. 6,290,766.

(51) Int. Cl.[7] .............................. C09C 1/00; C09C 1/22; C09C 1/24; C09C 1/34; C09C 1/36
(52) U.S. Cl. ..................... 106/417; 106/415; 106/418; 106/439; 106/440; 106/441
(58) Field of Search ................... 106/418, 417, 106/415, 439, 440, 441

(56) References Cited

U.S. PATENT DOCUMENTS

| 3,087,828 A | * | 4/1963 | Linton | 106/418 |
| 3,087,829 A | * | 4/1963 | Linton | 106/418 |
| 3,711,308 A | * | 1/1973 | Brand et al. | 106/418 |
| 3,926,659 A | * | 12/1975 | Bernhard et al. | 106/291 |
| 4,456,486 A | * | 6/1984 | Bernhard | 106/418 |
| 4,744,832 A | * | 5/1988 | Franz et al. | 106/418 |
| 5,286,291 A | * | 2/1994 | Bernhardt et al. | 106/474 |
| 5,356,471 A | * | 10/1994 | Reynders | 106/489 |
| 5,626,661 A | * | 5/1997 | Schmid et al. | 106/415 |

FOREIGN PATENT DOCUMENTS

| EP | 278633 | * | 8/1988 |
| EP | 0278633 | | 8/1988 |
| EP | 571836 | * | 12/1993 |
| EP | 0571836 A1 | | 12/1993 |
| EP | 0571836 B1 | | 12/1993 |
| EP | 579091 | * | 1/1994 |
| EP | 0579091 A1 | | 1/1994 |
| EP | 0579091 B1 | | 1/1994 |
| GB | 974874 | * | 11/1964 |
| WO | 93/12182 | | 6/1993 |
| WO | WO 93/12182 | * | 6/1993 |

* cited by examiner

*Primary Examiner*—C. Melissa Koslow
(74) *Attorney, Agent, or Firm*—Ostrolenk, Faber, Gerb & Soffen

(57) ABSTRACT

A lustrous interference pigment with a black absorption color is obtained by forming a mica coated with hydrous titanium, iron and cobalt or chromium oxides, calcining the coated mica and then coating the resulting product with hydrous titanium and/or iron oxides and calcining the resulting product.

8 Claims, No Drawings

LUSTROUS INTERFERENCE PIGMENTS WITH BLACK ABSORPTION COLOR

CROSS-REFERENCE TO RELATED APPLICATION

This is a continuation of U.S. patent application Ser. No. 09/256,834, filed Feb. 24, 1999 filed in the name of Carmine Vincent DeLuca, Jr., et al. and entitled "LUSTROUS INTERFERENCE PIGMENTS WITH BLACK ABSORPTION COLOR", now U.S. Pat. No. 6,290,766.

BACKGROUND OF THE INVENTION

Nacreous pigments produce pearl-like, metallic, and iridescent effects. A widely used type comprises muscovite mica platelets coated with a metallic oxide, such as titanium dioxide. A relatively thin titanium dioxide coating produces a pearl-like or silvery luster. Mica platelets with thicker coatings produce color, even though the components are colorless, through the phenomenon of light interference. This type of coated platelets is known as an interference pigment. The color, called the reflection color, is seen most effectively by specular or mirror-like reflection, where the angle of reflection equals the angle of incidence. The reflection color is a function of optical thickness, i.e. the geometrical thickness times the refractive index, of the coating. Optical thickness of about 80 nm to about 140 nm produce reflections which may be called white, silvery or pearly while optical thickness of about 190 nm or more produces color reflections.

The pearlescent pigments which are most frequently encountered on a commercial basis are titanium dioxide-coated mica and iron oxide-coated mica pearlescent pigments. It is also well known that the metal oxide layer can be overcoated to achieve various desired effects. For instance, Linton, U.S. Pat. No. 3,087,828, describes mica coated with various oxides including those of titanium, iron, cobalt and chromium over which, if desired, a layer of calcined titanium dioxide can be positioned. Brand, U.S. Pat. No. 3,711,308, describes mica coated with a first layer which is a mixture of oxides of titanium and one or more metal oxides which can be, for instance, the oxides of iron, chromium and/or cobalt and a second layer of titanium dioxide. Franz, U.S. Pat. No. 4,744,832, describes coating mica with a layer of titanium dioxide and calcining to form two layers, an inner titanium dioxide layer and an outer pseudobrookite layer. A second layer of iron oxide is deposited and the pigment is recalcined.

Producing pearlescent interference pigments having black absorption colors which are high quality lustrous products has proven to be difficult. To obtain such products, use of chemical vapor deposition techniques is described, for instance, in European Patents 0579091 and 0571836. Techniques are known which use carbon black or titanium reduction as described, for instance, in U.S. Pat. Nos. 5,356,471 and 5,286,291. Unfortunately, these approaches have proven to be costly and/or impractical. Vapor deposition procedures are expensive and can have difficulty in producing the desired pigments in mass quantities required by the market. In addition, many pigments prepared in this manner need to be reheated at higher temperatures after initial production in order to achieve the desired result. Carbon black procedures are not very efficient since the majority of the pigment platelets being treated are not coated properly. The reduction techniques are very costly.

It is accordingly the object of the present invention to provide a new technique for producing lustrous, interference pigments having a black absorption color which overcomes difficulties encountered in the prior techniques and to provide high quality, lustrous, interference pigments having the black absorption color.

SUMMARY OF THE INVENTION

The present invention relates to lustrous pearlescent interference pigments having black absorption color and to a process for the production of such pigments. More particularly, the pigment is a mica substrate coated with a calcined layer containing a mixture of the oxides of titanium, iron and at least one of cobalt and chromium and a second calcined layer containing an oxide of titanium or iron or both. The product is achieved by coating a mica substrate with hydrous titanium, iron and cobalt and/or chromium oxides, calcining the coated mica, coating the calcined mica with hydrous oxides of titanium and/or iron and then calcining the resulting product.

The process of the invention has the advantage of employing well known deposition technology while taking advantage of the interaction of particular metal oxides to develop black interference colors. Special equipment is not required and the product can be made in very large quantities and employed in the usual industrial, automotive and cosmetic markets in which pearlescent pigments have been employed heretofore.

DETAILED DESCRIPTION OF THE INVENTION

The procedure of the present invention provides mica platelets having two calcined layers coated thereon in sequence, The first layer contains a combination of titanium dioxide, iron oxide and either cobalt oxide or chromium oxide or both. The second layer contains titanium dioxide or iron oxide or both.

The micaceous platelet substrate, the titanium, iron, cobalt and chromium reagents, the coating conditions and procedures and calcining conditions and procedures are all individually well known in the art. See, e.g., the aforementioned Linton U.S. Pat. Nos. 3,087,828 as well as 3,087,829. In general, the mica is slurried in a suitable medium, preferably water, which contains or to which is added a metal containing reagent and the hydrous form of the metal oxide is coated on the mica platelets by suitable adjustment of the pH.

The hydrous form of the oxide is then converted to the oxide by calcination. It is also well known to employ various reagents and conditions in order to cause the titanium dioxide to be in the anatase or rutile crystalline form. The present invention differs from prior procedures by deliberately employing a dual layer configuration and in the selection of the metal oxides in each layer.

The oxides present in the initial layer on the mica substrate is a mixture of titanium dioxide, iron dioxide and one or both of cobalt oxide and chromium oxide. The mica is first coated with a hydrous mixture of the metal oxides which is then calcined. The mica can be coated with the individual oxides in any desired order and if desired, the coated mica can be recovered, washed and/or dried after each metal is deposited. It is most convenient and therefore preferred to coat the mica with the metal oxides seriatim without isolation of each intermediate product by changing the pH with a suitable reagent such as sodium hydroxide or hydrochloric acid. For example, of the hydrous metal oxides of the first layer, the hydrous titanium dioxide is coated on the mica substrates at the most acid pH. Raising the pH will then cause the hydrous iron oxide and finally the cobalt and/or chromium oxides to deposit.

The two coating layers on the mica pigments of the present invention in combination have an interference color thickness. This generally ranges from about 60–150 nm. In general, the layer closest to the mica constitutes about 2 to 25% of the thickness of the two coating layers and preferably about 10 to 20%.

In the first coating layer, the titanium dioxide is about 20 to 90 wt. % based on the total weight of the oxides, and preferably about 40 to 60%. The iron oxide is about 5 to 40% and preferably about 20 to 30% and the chromium and/or cobalt constitutes the balance of about 5 to 40% and preferably about 20 to 30%.

The following examples are set forth in order to further illustrate the invention without being intended to limit it. Throughout the specification and claims, all parts and percentages are by weight and all temperatures in degrees are Centigrade unless otherwise indicated.

EXAMPLE 1

One hundred parts of mica was slurried in 1000 parts of distilled water which was then heated to 7420 C. and the pH adjusted to 1.9 with hydrochloric acid. With the pH being maintained at 1.9, a 30% aqueous solution of $SnCl_4 \cdot H_2O$ was added over 8 minutes. The dispersion was stirred for 30 minutes and then a 40% aqueous solution of titanium tetrachloride was added over 60 minutes. Thereafter the pH was raised to 3.5 with sodium hydroxide and a 39% ferric chloride aqueous solution added over 80 minutes. Thereafter the pH was raised to 9 with 35% NaOH and 197 parts of a 30% $CoSO_4 \cdot 7H_2O$ aqueous solution was added at a rate of 2 ml/min. The coated mica was recovered from the dispersion by filtration, washed with water and then calcined for ½ hour at 400° C.

The calcined pearlescent pigment was slurried in distilled water and then heated to 74° C. An additional quantity of the titanium tetrachloride solution was added at a pH of about 1.9. The resulting pigment was recovered from the slurry by filtration, washed with water and then calcined at 850° C. The resulting product was black and lustrous.

EXAMPLE 2

The procedure of Example 1 was repeated except that the cobalt sulfate solution was replaced with the same amount of an aqueous $CrCl_3 \cdot H_2O$ aqueous solution.

EXAMPLE 3

Example 2 was repeated except in the second coating procedure, a ferric chloride solution was employed instead of the titanium chloride solution and the pH was adjusted to 3.5.

EXAMPLE 4

One hundred parts of mica was slurried in 1000 parts of distilled water which was then heated to 74° C. and the pH adjusted to 3.5 with hydrochloric acid. With the pH being maintained at 3.5, a 39% aqueous solution of ferric chloride added over 90 minutes. Thereafter the pH was raised to 9 with NaOH and a 36.4% $CoSO_4 \cdot 7H_2O$ aqueous solution was added over 90 minutes while maintaining the pH constant with NaOH. The coated mica was recovered from the dispersion by filtration, washed with water and then calcined at 850° C.

The calcined pearlescent pigment is slurried in distilled water and then heated to 74° C. An additional quantity of the titanium tetrachloride solution is added at a pH of about 1.9. After recovery from the slurry by filtration, and washing with water, calcination is done at 850° C.

EXAMPLE 5

The procedure of Example 4 was repeated except that the calcination temperature was 400° C.

The calcined pearlescent pigment was slurried in distilled water and then heated to 74° C. A titanium chloride aqueous solution was added at a pH of about 1.94. The resulting pigment was recovered from the slurry by filtration, washed with water and then calcined at 850° C. The resulting product was black and lustrous and displayed magnetic properties.

EXAMPLE 6

The procedure of Example 4 was repeated except that the $CoSO_4 \cdot 7H_2O$ aqueous solution was replaced with an aqueous solution of $CrCl_3 \cdot 6H_2O$ and the pH was 7 rather than 9.

EXAMPLE 7

One hundred parts of mica was slurried in 1000 parts of distilled water which was then heated to 74° C. and the pH adjusted to 3.5 with hydrochloric acid. With the pH being maintained at 3.5, a 39% aqueous solution of ferric chloride added over 90 minutes. Thereafter the pH was raised to 7 with NaOH and a $CrCl_3 \cdot 6H_2O$ aqueous solution was added over 90 minutes while maintaining the pH constant with NaOH. The coated mica was recovered from the dispersion by filtration, washed with water and then calcined at 400° C.

The calcined pearlescent pigment was slurried in distilled water and then heated to 74° C. A titanium chloride aqueous solution was added at a pH of about 1.94. The resulting pigment was recovered from the slurry by filtration, washed with water and then calcined at 850° C. The resulting product was black and lustrous.

EXAMPLE 8

One hundred parts of mica was slurried in 1000 parts of distilled water which was then heated to 74° C. and the pH adjusted to 3.5 with hydrochloric acid. With the pH being maintained at 3.5, an aqueous solution of ferric chloride and $CrCl_3 \cdot 6H_2O$ was added over 90 minutes was added over 90 minutes while maintaining the pH constant with NaOH. The coated mica was recovered from the dispersion by filtration, washed with water and then calcined for at 400° C.

The calcined pearlescent pigment was slurried in distilled water and then heated to 74° C. A titanium chloride aqueous solution was added at a pH of about 1.94. The resulting pigment was recovered from the slurry by filtration, washed with water and then calcined at 850° C. The resulting product was black and lustrous.

EXAMPLE 9

The procedure of Example 4 was repeated except that the calcination temperature was 400° C.

The calcined pearlescent pigment was slurried in distilled water and then heated to 74° C. An additional quantity of the ferric chloride solution was added at a pH of about 3.4. The resulting pigment was recovered from the slurry by filtration, washed with water and then calcined at 850° C. The resulting product was black and lustrous.

Various changes and modifications can be made in the process and products of the present invention without departing from the spirit and scope thereof. The various embodiments which have been set forth herein were for the purpose of further illustrating the invention, but were not intended to limit it.

What is claimed is:

1. A lustrous interference pearlescent pigment having a black absorption color comprising mica platelets coated with a first layer comprising a mixture of the oxides of titanium, iron and at least one of cobalt and chromium and a second layer on the first layer, the second layer comprises an oxide of titanium.

2. The pearlescent pigment of claim 1, in which said first layer contains cobalt.

3. The pearlescent pigment of claim 1, in which said first layer contains chromium.

4. The pearlescent pigment of claim 1, in which said second layer comprises titanum dioxide.

5. The pearlescent pigment of claim 1, in which said first layer is about 2 to 25% of the thickness the two layers.

6. The pearlescent pigment of claim 1, in which said first layer contains about 20 to 90 % titanium dioxide and about 5 to 40% iron oxide.

7. The pearlescent pigment of claim 1, in which said first layer contains about 40 to 60% titanium dioxide and about 20 to 30% iron oxide.

8. The pearlescent pigment of claim 1, in which said first layer is about 10 to 20% of the thickness of the two layers.

* * * * *